Dec. 5, 1967  J. W. JACOBSON ET AL  3,355,992
ALTITUDE OR PRESSURE RESPONSIVE CONTROLS
Filed June 21, 1965  3 Sheets-Sheet 1
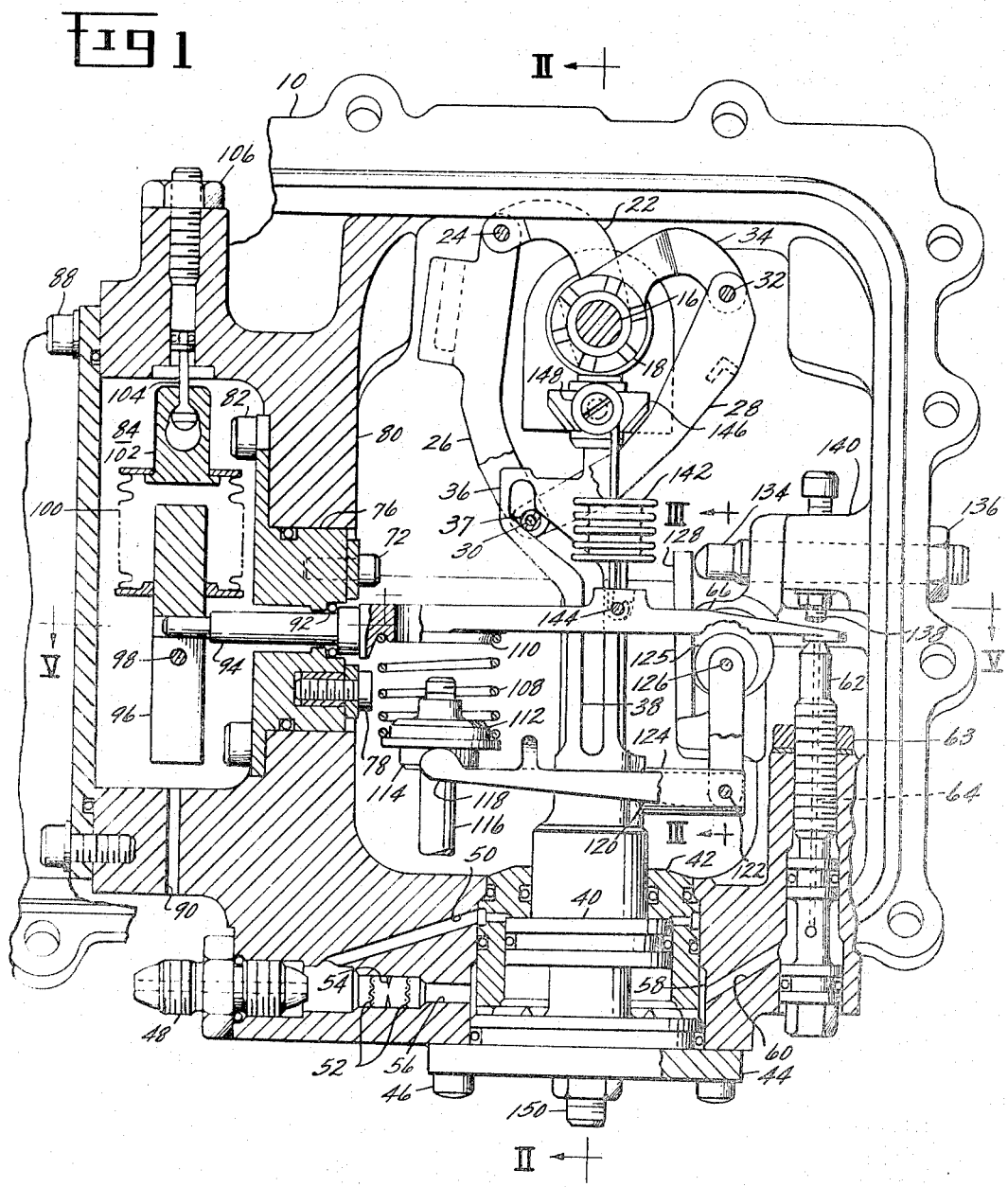
Fig 1
INVENTORS:
JOHN W. JACOBSON
JOHN W. POOLE
By
ATTORNEY

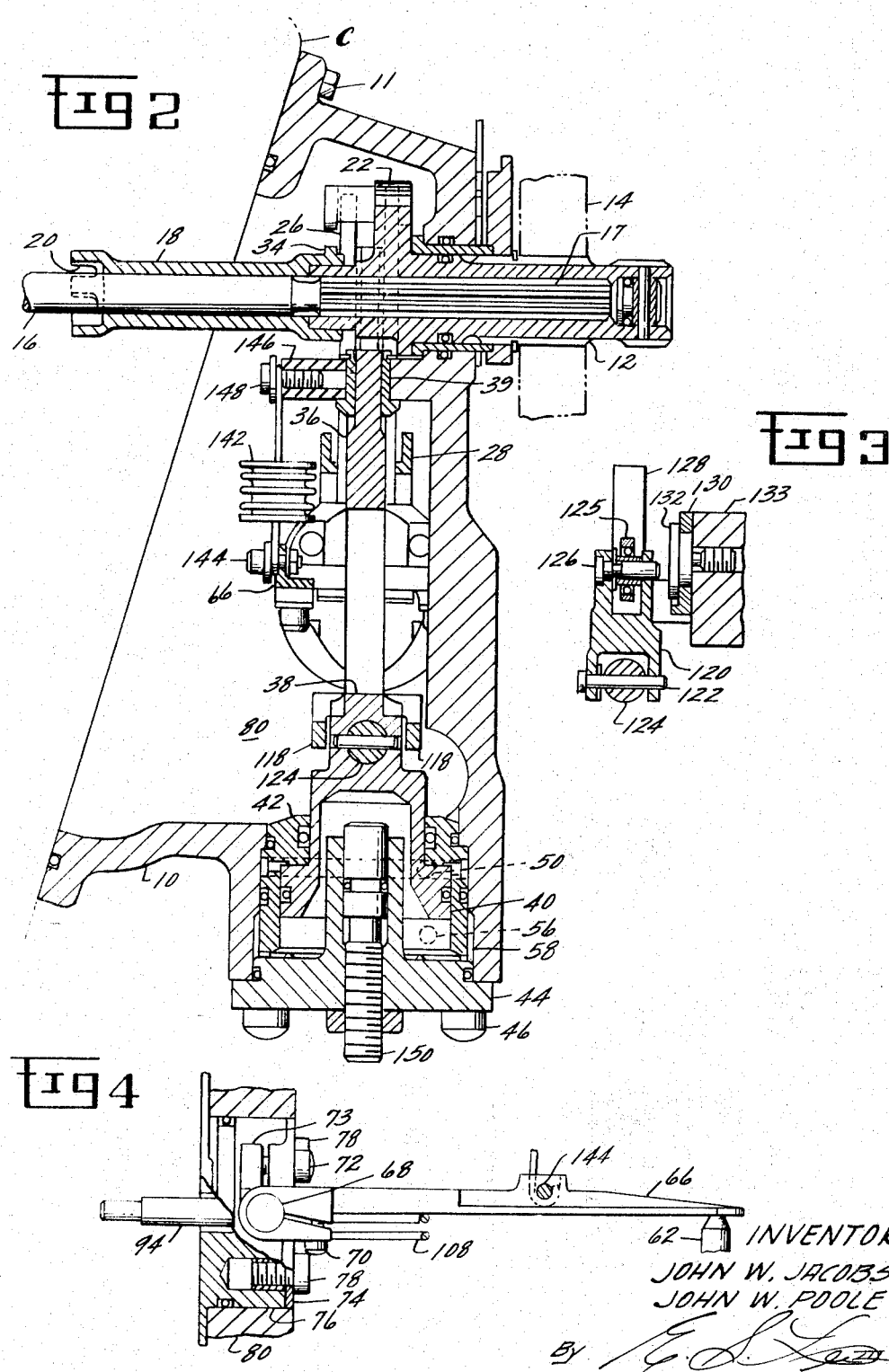

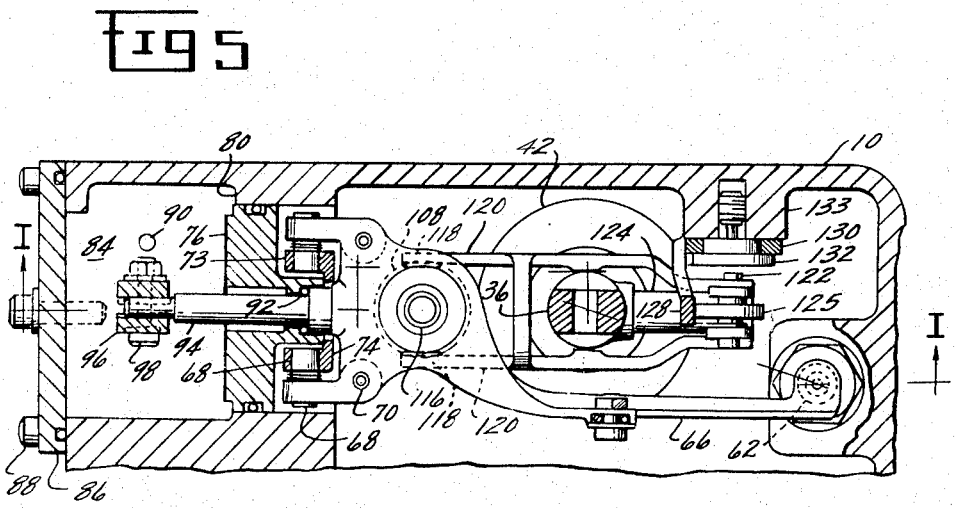

United States Patent Office 3,355,992
Patented Dec. 5, 1967

3,355,992
ALTITUDE OR PRESSURE RESPONSIVE
CONTROLS
John W. Jacobson, Melrose, and John W. Poole, Lynn,
Mass., assignors to General Electric Company, a corporation of New York
Filed June 21, 1965, Ser. No. 465,631
6 Claims. (Cl. 91—47)

The present invention relates to improvements in pressure responsive controls and more particularly to improvements in controls which are responsive to ambient atmospheric pressure reflecting altitude and as such are altitude responsive.

One object of the invention is to provide a pressure responsive control of extreme accuracy.

A more specific object of the invention is to provide an improved fuel control for a gas turbine engine or the like which is automatically adjusted to provide means for controlling fuel flow as a function of altitude.

In order to obtain the degree of accuracy which is necessary to attain the objectives of the present invention, the present control utilizes a force balance system preferably wherein the force generated by an evacuated bellows varies in accordance with ambient atmospheric pressures at various altitudes and is balanced against a spring force which varies as the disposition of a control member varies.

The control member is connected to a reciprocable piston and both have an extreme position for an initial pressure condition, usually ambient atmospheric pressure at "sea level." To this end means are provided for exerting fluid pressure forces on opposite sides of the piston. One side of the piston has a greater effective area than the other so that with equal pressures on opposite sides of the piston, the control member is maintained in its "sea level" position. A flow passageway communicates in part with one side of the piston and has a pressure dropping orifice upstream of the piston to reduce the fluid pressure force on the one side of the piston when there is flow of fluid through the pressure dropping orifice. The spring and bellows forces are effective on means for controlling fluid flow through this passageway so that the control member may be displaced to balance the spring force against the bellows force when the latter force is less than the initial spring force. The piston is thus displaced due to the pressure differential on opposite sides of the piston and maintained in an intermediate position when these forces are equal as a result of the controlled pressure drop across the orifice.

Displacement of the control member may thus be a direct function of the pressure of the bellows derived from ambient atmospheric pressure, rather than a function of bellows displacement. The described means also permit relatively strong forces to be exerted on the control member to maintain it in a position reflecting the force exerted by the bellows.

The control member advantageously comprises a cam track forming part of a lost motion connection between a throttle connected input shaft and an output shaft which is connected to a fuel flow control for a gas turbine engine.

The means providing the force opposing the atmospheric pressure force may be initially of sufficient magnitude so that the control member is not responsive to changes in altitude until a predetermined height has been reached.

The above and other related objects and features of the invention will be apparent from a reading of the following description of the disclosure found in the accompanying drawings and the novelty thereof pointed out in the appended claims.

In the drawings:

FIG. 1 is an elevation, partly in section as indicated generally by line I—I in FIG. 5, of a control device embodying the present invention;

FIG. 2 is a section taken generally on line II—II in FIG. 1;

FIG. 3 is a section taken generally on line III—III in FIG. 1;

FIG. 4 is a detail view of valve mechanism seen in FIG. 1;

FIG. 5 is a section taken generally on line V—V in FIG. 1; and

FIG. 6 is a perspective view further illustrating a linkage seen in FIG. 1.

The present device comprises (FIGS. 1, 2, and 5) a housing 10 which is secured by bolts 11 to a main fuel control C of the type normally employed to regulate the flow of fuel to a jet engine and indicated by the phantom outline in FIG. 2. A hollow shaft 12 is journaled in the housing 10 and has secured thereto a throttle lever 14 which is connected by known means to the pilot controlled throttle of an aircraft in which the present device is to be used. The throttle lever 14 is conventionally referred to as the alpha input. There are two outputs from the shaft 12 to the main fuel control C. The first is derived by means of a rod 16 which is telescoped within the shaft 12 and connected by a spline connection, indicated at 17, for rotation therewith. The second output from the shaft 12 is derived from a tubular output shaft 18 which is connected to the shaft 12 for rotation therewith through a lost motion connection which is the subject of the present invention. The inner end of the tubular shaft 18 is provided with slots 20 which connect with existing means in the main fuel control to rotate a cam employed in scheduling fuel flow to the engine.

Integral with the shaft 12 is a lever arm 22 which is pivotally connected by a pin 24 to a double armed link 26 (FIGS. 1 and 6). The lower portions of the arms of the link 26 are received between the lower portions of a second double armed link 28 and pivotally connected thereto by a pin 30. The link 28 is connected by a pin 32 to a lever arm 34 which is integral with the tubular output shaft 18. The arms of the links 26 and 28 embrace the upper end of a cam member 36 which has a cam slot 38 formed therein. The pin 30 passes through the slot 38 and has a roll 37 mounted thereon to be guided by the slot 38. It will be noted that the upper portion of the slot 38 is formed concentrically of the pivot pin 32, below a short vertical portion, so that when initial movement or rotation of the lever 14 and shaft 12 is made, the output shaft 16 rotates, as the output shaft 18 remains stationary. This permits the shaft 16 to open the stop cock of the main fuel control prior to rotation of the main fuel control cam which schedules an increasing amount of fuel beyond that necessary for light-off and idling.

At "sea level" it is usual to schedule the first fifteen degrees of rotation of the lever 14 for the function of opening the stop cock and bring the engine up to idle speed before rotation is transmitted to the main fuel control cam to schedule further fuel for acceleration and operation at greater than idle speed. Thus it will be noted that the roll 37 is displaced to the lower end of the curved portion of the cam track 38, it then moves downwardly into a vertical portion thereof to impart rotation to the lever arm 34 and the tubular output shaft 18. In order that a greater fuel flow will be automatically scheduled to the engine when the alpha lever 14 is in its "idle" position the cam member 36 is displaced downwardly to limit the counterclockwise position of the output shaft so that a greater fuel flow will be provided from the setting of the main fuel control cam.

To the end, it will be seen that the cam member 36 is guided by a bushing 39 (FIG. 2) at its upper end and has a piston 40 integrally formed at the lower end thereof. The piston 40 reciprocates in a sleeve 42 which is held in place in the housing 10 by a cap 44 and screws 46. Means now to be described are provided for controlling fluid pressure forces on the upper and lower surfaces of the piston 40 to thereby control movement of the cam member 36 as a function of altitude. Fluid, advantageously the fuel employed in operation of the jet engine, is introduced by way of a fitting 48 (FIG. 1) which is threaded into the housing 10. From the fitting 48 fuel flows through a passageway 50 in the housing 10 and sleeve 42 to the upper surface of the piston 40. Fuel also flows from the fitting 48 through a passageway 56 in the housing 10 and under the lower end of the sleeve 42 to the lower end of the piston 40. Filters 52 are provided on opposite sides of a pressure dropping orifice 54 in passageway 56. An annular chamber 58 surrounding the lower end of the sleeve 42 permits fuel to flow from passageway 56 to and through a passageway 60 to a jet nozzle 62 which is threaded into the housing 10 and secured by a check nut 63. Fuel flows through an internal hole 64 in the jet nozzle 62 and is discharged into the interior of housing 10 to be returned to the fuel pump through conduit means in the main fuel control. Discharge of fuel from the jet nozzle 62 is controlled by a flapper valve 66 which is mounted for limited pivotal movement by being clamped to spring pivots 68 (FIGS. 4 and 5) through the use of the screws 70. Screws 72 clamp the inner ends of the spring pivots 68 to split bushings 73 integral with a block 74 which in turn is secured to a mounting pad 76 by screws 78. Mounting pad 76 is clamped to an interior wall 80 of the housing 10 by screws 82. The interior wall 80 defines a chamber 84 (FIGS. 1 and 5) which is covered by an end cap 86 secured to the housing 10 by screws 88. The chamber 84 is vented to atmosphere by a port 90 and is sealed from the remainder of the interior of the housing 10 by means including an O-ring 92 effective between an extension 94 integral with the pivotal flapper valve 66 and the mounting pad 76. The outer end of the valve extension 94 is clamped to a split bar 96 by screw 98 which is secured to and projects downwardly from one end of an evacuated bellows 100. The opposite end of the bellows 100 is secured to a rod 102 which is joined to a pin 104 by a keyhole connection. The pin 104 is adjustably mounted in the housing 10 by a threaded connection and secured in adjusted position by a lock nut 106.

The bellows 100 exerts a torque force on the flapper valve 66 tending to rotate it in a clockwise direction, while an opposing torque force is provided by a spring 108 (FIGS. 1 and 5), the upper end of which is received by a seat 110 formed in the lower surface of the flapper valve 66. The lower end of the spring 108 is received by a seat 112 formed on a collar 114 which is slidably mounted on a fixed vertical rod 116. The bifurcated end 118 of a bell crank 120 underlies the collar 114. The bell crank 120 is pivotally mounted by pin 122 (see also FIG. 3) on an arm 124 which is pinned to (FIG. 2) and projects from the cam member 36. The opposite end of the bell crank 120 is also bifurcated and has a roll 125 pivotally mounted thereon by a pin 126. Roll 125 engages a camming arm 128 which has an offset base 130 (FIGS. 3 and 5) which is pivotally mounted on a shoulder screw 132 threaded into a boss 133 on the housing 10. It will be noted that the spring 108 exerts a force on the bell crank 120 (FIG. 1) tending to rotate it in a counterclockwise rotation. It will further be noted that the point of engagement of roll 125 with camming member 128 is a point spaced below the center of the shoulder screw 132 (best seen in FIG. 3) which is the pivot center for the member 128, thereby providing a force tending to rotate the member 128 in a clockwise direction about the axis of the shoulder screw 132. This rotation is limited by the engagement of the upper end of the member 128 with an abutment screw 134 which is threaded through the housing 10 and maintained in adjusted position by a check nut 136.

It will also be noted that pivotal movement of the flapper valve 66 is limited in one direction by engagement with the nozzle member 62 and in the opposite direction by a limit screw 138 which is threaded through an interior boss 140 formed on the housing 10. Pivotal movement of the flapper valve 66 is further controlled by a damping bellows 142 (FIGS. 1 and 2), one end of which is connected to the flapper valve 66 by screw 144 and the other end of which is connetced to a housing boss 146 by screw 148.

It will further be noted that various pins which are provided for pivotal connections are not secured axially. This omission is for the sake of clarity and it will be obvious where known means would be so employed. Likewise, appropriate sealing means and/or packings are provided where it is desired to prevent leakage without requiring detailed description.

While the present device could affect or modify scheduling of fuel to the engine at all altitudes above "sea level," its effect is generally not required at relatively low altitudes, say, 10,000 feet and below. The evacuated bellows 100 is calibrated to exert a sufficient torque force on the flapper valve 66 to overcome the force of spring 108 and maintain the jet nozzle 62 closed at atmospheric pressures normally existing below a given altitude, exemplarily 10,000 feet. With the jet nozzle closed and no flow of fuel through the pressure dropping orifice 54, the fluid pressures on opposite sides of the piston 40 are equal and since there is a greater area on the bottom of the piston, there is also a greater force which maintains the cam member 36 in its uppermost, "sea level" position.

However, as the altitude of the aircraft increases, the pressure within the chamber 84 continues to decrease and the bellows 100 exerts a progressively decreasing torque force on the flapper valve 66 (through extension 94). At a predetermined pressure reflecting a preselected altitude the force of the bellows 100 becomes less than the torque force of the spring 108. When this occurs the jet nozzle 62 is opened to vent fuel therefrom. As a consequence of this venting action, there is fuel flow through the orifice 54 and a consequent drop in the pressure on the lower surface of the piston 40. The reduced force on the lower surface of piston 40 causes the piston 40 and the cam member 36 to move downwardly from its "sea level" position as the fluid pressure force on the lower surface of piston 40 becomes less than that on its upper surface. As this occurs, the bell crank 120 also moves downwardly, and the bifurcated end 118 of this bell crank moves downwardly to reduce the counter-balancing torque force of spring 108 on the flapper valve 66. When the spring force and the bellows force are substantially in balance, the flapper valve 66 reduces the discharge of fuel from the jet nozzle 62 to a point where the pressure drop across the orifice 54 equalizes the forces on opposite sides of the piston 40 to thereby attain a force balance on this piston, thereby maintaining the control member 36 in a given heightwise position, which is a direct function of altitude.

It will be appreciated that there are two force balances involved in maintaining the cam member 36 in an intermediate position, one being the torque forces on the flapper valve 66 and the other being the fluid forces on opposite sides of the piston 40. It will also be appreciated that once a force balance is established on the flapper valve to obtain the predetermined flow rate for a force balance on the piston 40, there is only a minimum of elongation or contraction of the bellows 100 to re-establish these force balances when a change in altitude occurs. Thus the accuracy of the device is dependent on the spring rate of the spring 108 which may be closely controlled and not on the spring rate of the bellows 100.

It will be apparent that the rate of movement of the bifurcated end 118 of bell crank 120 is not only a function of the vertical position of the piston 40 but also a function of the angular disposition of the cam member 128. Thus by adjusting the slope of the member 128 (by means of screw 134), the extent of movement of the control member 36 may be adjusted to give a selected rate of change which is other than the spring rate of spring 108.

Thus by sloping the cam member so that the bifurcated end moves a slower rate than the cam member 36 a greater fuel flow change can be obtained for a given change in atmospheric pressure.

It will be noted downward movement of the piston 40 is limited by a stop screw 150 adjustably threaded through the cap 44.

Realizing that variations in the specific structural features herein described will be apparent to those skilled in the art, the scope of the present inventive concepts is to be derived from the following claims.

Having thus described the invention, what is claimed as novel and desired to be secured by Letters Patent of the United States is:

1. An altitude responsive fuel control comprising,
   a pivotal input shaft for connection to a throttle control lever,
   an output shaft for connection with fuel flow control means and pivotal coaxially of said input shaft,
   a lost motion connection between said input and output shafts including
      an arm projecting from said input shaft and an arm projecting from said output shaft,
      a link connected at one end to the input shaft arm,
      a second link connected at one end to the output shaft arm,
      said links being pivotally joined at their opposite ends and having a cam roller on their pivotal connection,
      a control member having a cam track guidingly receiving said roller and generated in part on a radius swung from the pivotal connection with the output shaft arm when the control member is in a "sea level" position and in part extending radially outwardly of said input and output shafts whereby motion is transmitted between said input and output shafts only when the input shaft is rotated a predetermined distance so that the cam roller passes to the outwardly extending portion of said cam track,
   a piston connected to one end of said control member,
   a housing for said links and control member and having a cylinder for receiving said piston,
   an inlet port in said housing for connection to a pressurized liquid source,
   a first passageway leading from said inlet port to one side of said piston,
   a second passageway from said inlet port to the other side of said piston,
   the effective area of said one side of said piston being greater than the effective area of said other side thereof,
   whereby when the liquid pressures on opposite sides of said piston are equal, the liquid pressure force on said one side will be greater and mantain the piston in an extreme, "sea level" position and the control member in its "sea level" position,
   a pressure dropping orifice in said first passageway,
   a jet nozzle,
   passageway means leading from said one side of said piston to said jet nozzle for the discharge of liquid therefrom,
   a pivotally mounted flapper valve, one end of which overlies and controls the discharge of liquid from said jet nozzle to thus control the rate of flow of liquid through said first passageway, the pressure drop across said orifice, and the liquid pressure and liquid pressure force on said one side of said piston,
   said housing having an internal wall separating a first chamber in which the jet nozzle is disposed and a second chamber which is sealed from the first chamber and vented to ambient atmospheric pressure,
   an evacuated bellows disposed in said second chamber,
   said flapper valve being pivotally mounted about an axis at said internal wall with an end thereof projecting into said second chamber,
   one end of said evacuated bellows being connected to said housing and the opposite end thereof being connected to the projecting end of said flapper valve to exert a torque force thereon in a direction preventing discharge of liquid from said jet nozzle, said bellows torque force progressively decreasing as the ambient atmospheric pressure decreases at increasing altitudes,
   a spring effective upon said flapper valve to exert an opposing torque force thereon tending to permit discharge of liquid from said jet nozzle,
   said spring being confined between said flapper valve and means displaceable in response to movement of said piston from said "sea level" position to progressively decrease the spring torque force as the control member is displaced from said "sea level" position,
   the bellows torque force being substantially greater than the initial spring torque force at ambient atmospheric pressures below a predetermined altitude and less than the initial spring torque force above said predetermined altitude whereby as the control is elevated above said predetermined altitude, a decrease in the bellows torque force permits discharge of liquid from said jet nozzle, a resultant pressure drop on said one side of said piston and displacement of the piston and the control member from said "sea level" position, such displacement being sufficient to decrease the spring torque force to a force balancing the bellows torque force and with the flapper valve controlling liquid discharge from the jet nozzle at a rate whereat the pressure drop across the orifice in said first passageway equalizes the liquid pressure forces on the opposite sides of said piston and maintains said control member in a stabilized position reflecting the altitude of the control device.

2. A control as in claim 1 wherein the piston responsive means confining said spring includes,
   a restraining member movable toward and away from said flapper valve,
   means for so moving said restraining member an incremental distance different from a corresponding incremental distance moved by said control member so that control member displacement may be different from the spring rate of said spring.

3. A control as in claim 2 wherein means are provided for adjusting the difference in incremental movements whereby a given change in altitude may be reflected by an adjustably selected amount of movement by the control member.

4. An altitude responsive fuel control comprising,
   an input shaft for connection to a throttle control lever,
   an output shaft for connection with fuel flow control means,
   a lost motion connection between said input and output shafts including a control member having a "sea level" position,
   a piston connected to said control member, and
   means for displacing said piston to shift said control member and thereby change the transmission of motion from the input shaft to the output shaft, said displacing means comprising a cylinder for receiving said piston,
   an inlet port in said housing for connection to a pressurized liquid source, a first passageway leading from said inlet port to one side of said piston, a second passageway leading from said inlet port to the other side of said piston, the effective area of said one side of said piston being greater than the effective area of said other side thereof, whereby when the liquid pressures on opposite sides of said piston are equal, the liquid pressure force on said one side will be greater and maintain the piston in an extreme, "sea level" position and the control member in its "sea level" position, a pressure dropping orifice in said first passageway, a jet nozzle, passageway means leading from said one side of said piston to said jet nozzle for the discharge of liquid therefrom, a pivotally mounted flapper valve, one end of which overlies and controls the discharge of liquid from said jet nozzle to thus control the rate of flow of liquid through said first passageway, the pressure drop across said orifice, and the liquid pressure and liquid pressure force on said one side of said piston, a chamber sealed from the liquid discharged from said jet nozzle and vented to ambient atmospheric pressure, an evacuated bellows disposed in said second chamber, said flapper valve being pivotally mounted and having an end thereof projecting into said chamber, one end of said evacuated bellows being connected to said housing and the opposite end thereof being connected to the projecting end of said flapper valve to exert a torque force thereon in a direction preventing discharge of liquid from said jet nozzle, said bellows torque force progressively decreasing as the ambient atmospheric pressure decreases at increasing altitudes, a spring effective upon said flapper valve to exert an opposing torque force thereon, tending to permit discharge of liquid from said jet nozzle, said spring being confined between said flapper valve and means displaceable in response to movement of said piston from said "sea level" position to progressively decrease the spring torque force as the control member is displaced from its "sea level" position, the bellows torque force being substantially greater than the initial spring force at ambient atmospheric pressures below a predetermined altitude and less than the initial spring torque force above said predetermined altitude, whereby as the control is elevated above said predetermined altitude, a decrease in the bellows torque force permits discharge of liquid from said jet nozzle, a resultant pressure drop on said one side of said piston and displacement of the piston and the control member from said "sea level" position, said displacement being sufficient to decrease the spring torque force to a force balancing the bellows torque force and with the flapper valve controlling liquid discharge from the jet nozzle at a rate whereat the pressure drop across the orifice in said first passageway equalizes the liquid pressure forces on the opposite sides of said piston and maintains said control member in a stabilized position reflecting the altitude of the control device.

5. An altitude responsive control comprising, a control member having a reference position, a piston connected to said control member, an inlet port for connection to a pressurized fluid source, a first passageway leading from said inlet port to one side of said piston, a second passageway leading from said inlet port to the other side of said piston, the effective area of said one side of said piston being greater than the effective area of said other side thereof, whereby when the fluid pressures on opposite sides of said piston are equal, the fluid pressure force on said one side will be greater and maintain the piston in an extreme reference position and the control member in its reference position, a pressure dropping orifice in said first passageway, a jet nozzle, passageway means leading from said one side of said piston to said jet nozzle for the discharge of liquid therefrom, a valve controlling the discharge of liquid from said jet nozzle to thus control the rate of flow of fluid through said first passageway, the pressure drop across said orifice and the fluid pressure and fluid pressure force on said one side of said piston, an evacuated bellows at ambient atmospheric pressure, one end of said bellows being connected to a fixed member and the opposite end thereof being connected to said valve to exert a force thereon in a direction preventing discharge of fluid from said jet nozzle, said bellows force progressively decreasing as the ambient atmospheric pressure decreases at increasing altitudes, a spring effective upon said valve to exert an opposing force thereon tending to permit discharge of fluid from said jet nozzle, said spring being confined between said valve and means displaceable in response to movement of said piston from said reference position to progressively decrease the spring force as the control member is displaced from its reference position, the bellows force being substantially greater than the initial spring force at ambient atmospheric pressures below a predetermined altitude and less than the initial spring force above said predetermined altitude whereby as the control is elevated above said predetermined altitude, a decrease in the bellows force permits discharge of fluid from said jet nozzle, a resultant pressure drop on said one side of said piston and displacement of the piston and the control member from said reference position, said displacement being sufficient to decrease the spring force to a force balancing the bellows force and with the valve controlling fluid discharge from the jet nozzle at a rate whereat the pressure drop across the orifice in said first passageway equalizes the fluid pressure forces on the opposite sides of said piston and maintains said control member in a stabilized position reflecting the altitude of the control device.

6. An altitude responsive control device comprising, a control member, a reciprocable piston to which the control member is connected, means for exerting fluid pressure forces on opposite sides of said piston, said means including a flow passageway in part communicating with one side of said piston, a pressure dropping orifice in said flow passageway upstream of said piston, said fluid pressure exerting means exerting a greater force on said one side of the piston when there is no flow of fluid through said flow passageway to maintain said piston in an extreme position and exerting equal forces on opposite sides of said piston when there is a predetermined rate of flow therethrough to maintain said piston in an intermediate position, means for controlling the flow rate through said passageway so that the pressure on said one side can be greater or less than the pressure on the other side and equal at said predetermined rate to thereby position the piston in an intermediate position, means providing a force effective on said flow control means which varies in proportion to atmospheric pressure, means for providing an opposing force effective on said flow control means which varies as a function of piston position, said flow control means being responsive to equal forces thereon to establish said predetermined rate of flow, whereby the piston and the control member connected thereto will be maintained in a position reflecting the altitude for a given ambient atmospheric pressure.

References Cited

UNITED STATES PATENTS

| | | | |
|---|---|---|---|
| 2,291,048 | 7/1942 | Lichtenstein | 91—387 |
| 2,408,685 | 10/1946 | Rosenberber | 91—387 |
| 2,968,283 | 1/1961 | Hilker et al. | 91—387 |

FOREIGN PATENTS

| | | |
|---|---|---|
| 563,325 | 9/1958 | Canada. |
| 1,013,907 | 8/1957 | Germany. |

MARTIN P. SCHWADRON, *Primary Examiner.*

PAUL E. MASLOUSKY, *Examiner.*